(12) United States Patent
Shinzawa (10) Patent No.: US 11,453,253 B2
(45) Date of Patent: Sep. 27, 2022

(54) PNEUMATIC TIRE

(71) Applicant: The Yokohama Rubber Co., LTD., Tokyo (JP)

(72) Inventor: Tatsuro Shinzawa, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 226 days.

(21) Appl. No.: 16/317,801

(22) PCT Filed: Apr. 27, 2017

(86) PCT No.: PCT/JP2017/016731
§ 371 (c)(1),
(2) Date: Jan. 14, 2019

(87) PCT Pub. No.: WO2018/012087
PCT Pub. Date: Jan. 18, 2018

(65) Prior Publication Data
US 2019/0160890 A1    May 30, 2019

(30) Foreign Application Priority Data
Jul. 14, 2016  (JP) .............................. JP2016-139182

(51) Int. Cl.
*B60C 19/00*  (2006.01)
*B60C 11/03*  (2006.01)
*B60C 5/00*   (2006.01)

(52) U.S. Cl.
CPC .............. *B60C 19/002* (2013.01); *B60C 5/00* (2013.01); *B60C 11/03* (2013.01); *B60C 19/00* (2013.01); *B60C 2011/0341* (2013.01)

(58) Field of Classification Search
CPC .............................. B60C 19/002; B60C 5/002
See application file for complete search history.

(56) References Cited

U.S. PATENT DOCUMENTS 4,399,851 A     8/1983  Bschorr
7,455,092 B2 *  11/2008 Yukawa ................... B60B 3/04
                                                    152/375

(Continued)

FOREIGN PATENT DOCUMENTS

| JP | S56-167505  | 12/1981 |
| JP | 2005-262920 | 9/2005  |

(Continued)

OTHER PUBLICATIONS

International Search Report for International Application No. PCT/JP2017/016731 dated Jun. 13, 2017, 4 pages, Japan.

*Primary Examiner* — Justin R Fischer
(74) *Attorney, Agent, or Firm* — Thorpe North & Western (57) ABSTRACT

In a pneumatic tire, first and second sound absorbing members are adhered to an inner surface of a tread, have a total volume ranging from 10% to 40% of a capacity of a tire cavity, and are separated from each other by 60% of the width of a center land. The first sound absorbing member is on one side in a lateral direction with respect to a position of 40% of a width of the center land from one end of the center land on one side in the lateral direction to the other side in the lateral direction. The second sound absorbing member is on the other side in the lateral direction with respect to a position of 40% of the width of the center land from the other end of the center land in the lateral direction to the one side in the lateral direction.

6 Claims, 4 Drawing Sheets

(56) References Cited

U.S. PATENT DOCUMENTS

| | | | |
|---|---|---|---|
| 7,735,532 B2* | 6/2010 | Tanno | B60C 19/002 |
| | | | 152/157 |
| 7,886,788 B2* | 2/2011 | Yukawa | B60C 19/002 |
| | | | 152/209.1 |
| 8,439,091 B2* | 5/2013 | Tanno | B60C 19/002 |
| | | | 152/157 |
| 2005/0205183 A1 | 9/2005 | Yukawa | |
| 2007/0119533 A1 | 5/2007 | Yukawa | |
| 2009/0277549 A1 | 11/2009 | Tanno | |
| 2010/0270101 A1 | 10/2010 | Yukawa | |
| 2010/0294406 A1 | 11/2010 | Tanno | |
| 2016/0288587 A1* | 10/2016 | Tanno | B60C 1/00 |
| 2017/0008354 A1 | 1/2017 | Sakamoto et al. | |

FOREIGN PATENT DOCUMENTS

| | | |
|---|---|---|
| JP | 2007-160979 | 6/2007 |
| JP | 2010-269767 | 12/2010 |
| JP | 2013-112062 | 6/2013 |
| JP | 5267288 | 8/2013 |
| WO | WO 2015/111315 | 7/2015 |

* cited by examiner

PNEUMATIC TIRE

TECHNICAL FIELD

The present technology relates to a pneumatic tire including a tire noise reduction device and particularly relates to a pneumatic tire that can prevent degradation in high-speed durability due to accumulated heat in a sound absorbing member at high speeds while sufficient quietness is achieved by the sound absorbing member mounted on a tire inner surface.

BACKGROUND ART

One of the factors that generate tire noise is cavernous resonance caused by the vibration of the air filled in a cavity portion (tire cavity) formed in a tire when the tire is mounted on a rim. This cavernous resonance occurs when a tread portion of a tire that contacts a road surface vibrates due to unevenness or the like of the road surface when a vehicle is driven, and this vibration vibrates the air in the tire cavity. Because, among the cavernous resonance, sound in a particular frequency band is perceived as noise, it is important to reduce the level of sound pressure in the frequency band (level of noise) from the perspective of reducing the tire noise.

As a method of reducing such noise, it has been proposed to introduce a sound absorbing member formed of a porous material, such as a sponge, in the tire cavity. For example, Japan Patent No. 5267288 proposes a pneumatic tire provided with a band-like sound absorbing member adhered on an inner circumferential surface of a tread portion with an adhesive. However, in this structure, the sound absorbing member is directly adhered on the tire inner surface, Thus, heat is liable to be accumulated in the tread portion at high speeds. This causes a problem of degradation of the high-speed durability due to the accumulated heat.

SUMMARY

The present technology provides a pneumatic tire including a tire noise reduction device, which can prevent degradation in high-speed durability due to accumulated heat in a band-like sound absorbing member at high speeds while sufficient quietness is achieved by the sound absorbing member mounted on a tire inner surface.

An embodiment of the present technology is a pneumatic tire including a tread portion extending in a tire circumferential direction and having an annular shape, a pair of side wall portions disposed on both sides of the tread portion, a pair of bead portions disposed inward of the pair of side wall portions in a tire radial direction, a carcass layer mounted between the pair of bead portions, a plurality of belt layers disposed on an outer circumferential side of the carcass layer in the tread portion, circumferential grooves extending along the tire circumferential direction in a tire outer surface of the tread portion, and land portions defined between the circumferential grooves that are adjacent to each other in the tire lateral direction. The number of the circumferential grooves is two or more. The number of land portions is one or more. The one or more land portions include a center land portion continuously extending along an entire circumference of the tire and being disposed on a tire equator. A first sound absorbing member and a second sound absorbing member are adhered to a tire inner surface of the tread portion. The first sound absorbing member and the second sound absorbing member have a total volume ranging from 10% to 40% of a capacity of a tire cavity. The first sound absorbing member is disposed on one side in the tire lateral direction with respect to a position of 40% of a width Wc of the center land portion from one end portion of the center land portion on one side in the tire lateral direction to the other side in the tire lateral direction. The second sound absorbing member is disposed on the other side in the tire lateral direction with respect to a position of 40% of the width Wc of the center land portion from one end portion of the center land portion on the other side in the tire lateral direction to the one side in the tire lateral direction. The first sound absorbing member and the second sound absorbing member are separated from each other by 60% or more of the width Wc of the center land portion.

In the present technology, when the sound absorbing members are provided in the tire, the ratio of the volume of the absorbing members to the capacity of the tire cavity (volume ratio of the sound absorbing members) are set from 10% to 40% as described above so that the sound absorbing members are sufficiently increased in size. Thus, an excellent sound absorbing performance can be obtained, and a noise performance can be improved. In this case, the above-mentioned volume ratio is attempted to be achieved with a single sound absorbing member, accumulated heat in the sound absorbing member at high speeds is increased, and hence, the high-speed durability is adversely influenced. However, in the present technology, as described above, the pair of sound absorbing members including the first sound absorbing member and the second sound absorbing member are employed. The pair of sound absorbing members are separated from each other as described above, and are disposed at the positions while avoiding an inner surface side of the center land portion, in which heat is most liable to be generated in the tread portion and accumulated heat is liable to be generated when the sound absorbing members are caused to directly adhere. Thus, the accumulated heat at high speeds can effectively be suppressed, and the high-speed durability can be improved. The first sound absorbing member or the second sound absorbing member is disposed on the one side or the other side in the tire lateral direction with respect to the position 40% of the width Wc of the center land portion from one end portion or the other end portion of the center land portion in the tire lateral direction to the other side or the one side in the tire lateral direction. Note that, in the present technology, such structure includes the case where the end portion of the first sound absorbing member or the end portion of the second sound absorbing member on the inner side in the tire lateral direction matches with a position of 40% of the width Wc of the center land portion from the one end or the other end of the center land portion in the tire lateral direction to the other side or to the one side in the tire lateral direction.

In the present technology, a mounting direction on a vehicle is designated. The one side in the tire lateral direction is a vehicle inner side being an inner side with respect to an inner side with respect to the vehicle at a time of mounting on the vehicle. The other side in the tire lateral direction is a vehicle outer side being an outer side with respect to the vehicle at a time of mounting on the vehicle. It is preferred that a volume V1 of the first sound absorbing member be smaller than a volume V2 of the second sound absorbing member. With this structure, in the vehicle intended for high-speed driving on which the tires are mounted so as to be mainly in negative camber, the sound absorbing member (the first sound absorbing member) causing the accumulated heat is reduced in size on the vehicle inner side in which heat is relatively liable to be generated in order to improve the high-speed durability. A relatively large amount of the sound absorbing member (the second sound absorbing member) is secured on the vehicle outer side in which the heat is relatively less liable to be generated in order to maintain the noise performance. Thus, the structure is advantageous in providing these performances in a well-balanced and compatible manner.

In this case, it is preferred that a ratio of V2/V1 of the volume V1 of the first sound absorbing member and the volume V2 of the second sound absorbing member satisfy a relationship of $1.2 \leq V2/V1 \leq 3.8$. With this, the balance of the volume of the pair of sound absorbing members can be satisfactory, and hence the structure is advantageous in providing the high-speed durability and the noise performance in a compatible manner.

In the present technology, the following structure is preferred. That is, the mounting direction on the vehicle is designated. The one side in the tire lateral direction is the vehicle inner side being the inner side with respect to the vehicle at a time of mounting on the vehicle, and the other side in the tire lateral direction is the vehicle outer side being the outer side with respect to the vehicle at a time of mounting on the vehicle. The number of the circumferential grooves is four or more. The number of land portions is three or more. In addition to the center land portion, the three or more land portions include an innermost land portion, which is disposed at a position adjacent to the vehicle outer side of a circumferential groove continuously extending along the entire circumference of the tire and being positioned on a vehicle innermost side. The first sound absorbing member is disposed on the vehicle inner side with respect to a position of 45% of a width Wi of the innermost land portion from an end portion of the innermost land portion on the vehicle inner side to the vehicle outer side. The second sound absorbing member is disposed on the vehicle outer side with respect to a position of 30% of the width Wc of the center land portion from an end portion of the center land portion on the vehicle outer side to the vehicle inner side. With this structure, in the vehicle intended for high-speed driving in which the tires are mounted mainly in negative camber, in a case where four or more circumferential grooves are provided to provide a large number of land portions (three or more land portions), avoiding the region from the center land portion to the innermost land portion (region in which heat is liable to be generated after the center land portion) can be avoided as well as the center land portion. Accordingly, the accumulated heat is prevented more effectively, and the high-speed durability can further be improved. The first sound absorbing member is disposed on the vehicle inner side with respect to the position of 45% of the width Wi of the innermost land portion from the end portion of the innermost land portion on the vehicle inner side to. Note that, in the present technology, such structure includes the case where the end portion of the first sound absorbing member on the inner side in the tire lateral direction matches with the position of 45% of the width Wi of the innermost land portion from the end portion of the innermost land portion on the vehicle inner side to the vehicle outer side. The second sound absorbing member is disposed on the vehicle outer side with respect to the position of 30% of the width Wc of the center land portion from the end portion of the center land portion on the vehicle outer side to the vehicle inner side. Such structure includes the case where the end portion of the second sound absorbing member on the inner side in the tire lateral direction matches with the position of 30% of the width Wc of the center land portion from the end portion of the center land portion on the vehicle outer side to the vehicle inner side.

In the present technology, it is preferred that the end portion of the first sound absorbing member and the end portion of the second sound absorbing member on the outer side in the tire lateral direction be disposed inward in the tire lateral direction with respect to the end portions of the belt layers in the tire lateral direction. With this structure, the sound absorbing members are not disposed across the end portions of the belt layers on the outer side in the tire lateral direction. Thus, the sound absorbing members are not influenced by strain caused at the end portions of the belt layers, and the structure is advantageous in improving the high-speed durability.

In the present technology, it is preferred that each of the first sound absorbing member and the second sound absorbing member includes a missing portion at at least one section in the tire circumferential direction. With this, it becomes possible for the band-like sound absorbing members to tolerate deformation of a tire during inflation (expansion of the tire) and/or shearing strain at the contact surface due to rolling on ground for a long period of time.

Note that, in the present technology, dimensions and cross-sectional areas of the tire are measured with the tire mounted on a regular rim and inflated to the regular internal pressure. Particularly, a width of each of the members is a length between both end portions of each of the members in the width direction in this condition. Note that, "width BT of the belt layer" indicate a width of the belt layer of the plurality of belt layers, which is disposed on an outermost circumferential side. Further, "capacity of tire cavity" is a capacity of the cavity portion formed between the tire and the rim (capacity of the entire cavity portion without the sound absorbing members) in this condition. "Regular rim" is a rim defined by a standard for each tire according to a system of standards that includes standards on which tires are based, and refers to a "standard rim" in the case of JATMA (Japan Automobile Tyre Manufacturers Association, Inc.), refers to a "design rim" in the case of TRA (Tire and Rim Association, Inc.), and refers to a "measuring rim" in the case of ETRTO (European Tyre and Rim Technical Organisation). "Regular internal pressure" is an air pressure defined by standards for each tire according to a system of standards that includes standards on which tires are based, and refers to a "maximum air pressure" in the case of JATMA, refers to the maximum value in the table of "TIRE ROAD LIMITS AT VARIOUS COLD INFLATION PRESSURES" in the case of TRA, and refers to the "INFLATION PRESSURE" in the case of ETRTO. However, the air pressure which is displayed on the vehicle is used in a case where the tire is an original equipment tire. "Regular load" is a load defined by a standard for each tire according to a system of standards that includes standards on which tires are based, and refers to a "maximum load capacity" in the case of JATMA, refers to the maximum value in the table of "TIRE ROAD LIMITS AT VARIOUS COLD INFLATION PRESSURES" in the case of TRA, and refers to "LOAD CAPACITY" in the case of ETRTO.

DETAILED DESCRIPTION

Now, with reference to the accompanying drawings, detailed description is made of configurations of embodiments of the present technology.

Figure 1:
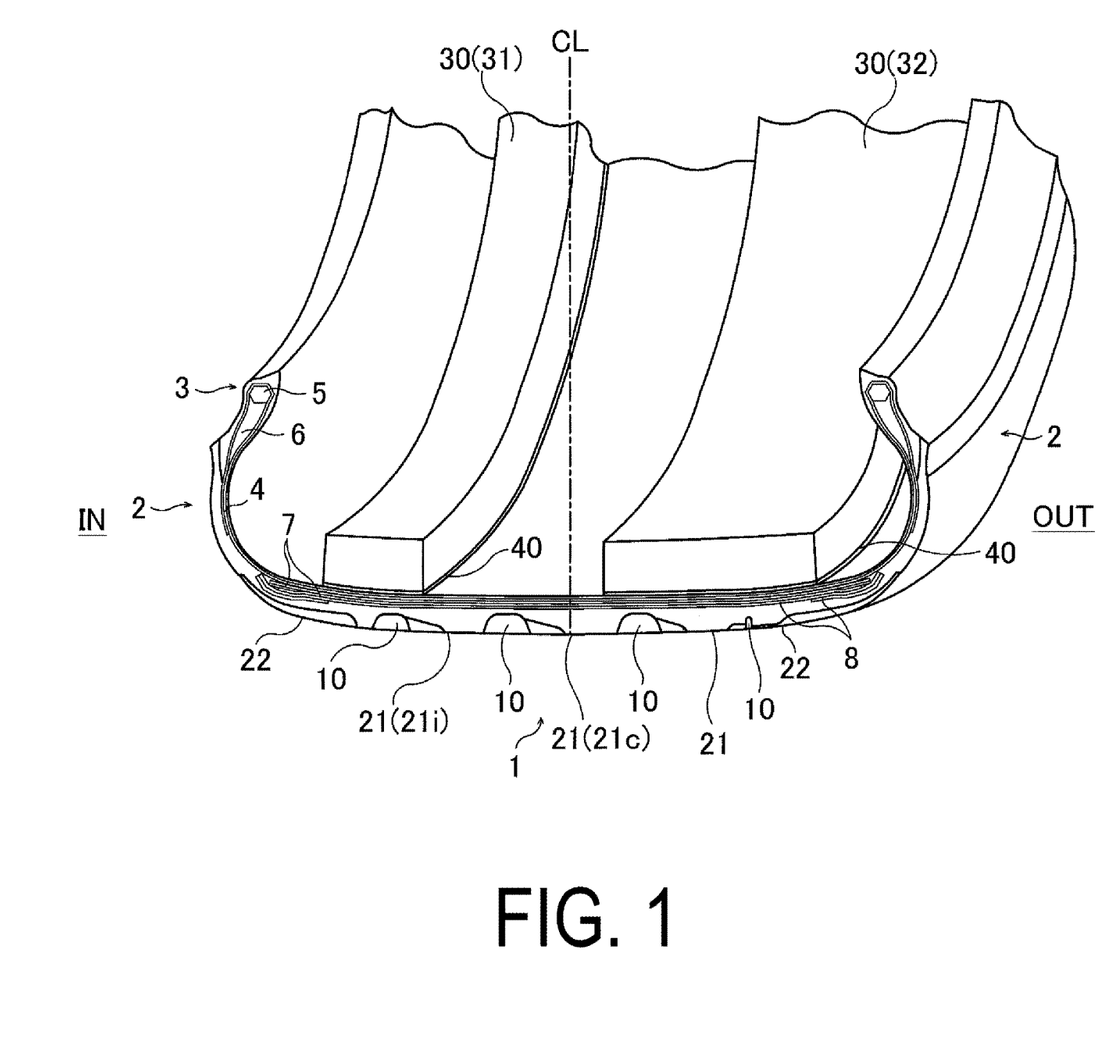
FIG. 1 is a perspective cross-sectional view of a pneumatic tire according to an embodiment of the present technology.

As illustrated in FIG. 1, a pneumatic tire according to the present embodiment includes an annular tread portion 1 extending in a tire circumferential direction, a pair of sidewall portions 2 disposed on both sides of the tread portion 1, and a pair of bead portions 3 disposed inward of the sidewall portions 2 in a tire radial direction. The reference sign CL in FIG. 1 denotes the tire equator. In the pneumatic tire, a mounting direction on a vehicle is designated. Specifically, the IN side in the drawings is a side designated to be an inner side with respect to the vehicle when the tire is mounted on the vehicle (hereinafter referred to as vehicle inner side), and the OUT side in the drawings is a side designated to be an outer side with respect to the vehicle when the tire is mounted on the vehicle (hereinafter referred to as vehicle outer side).

A carcass layer 4 is mounted between the right-and-left pair of bead portions 3. The carcass layer 4 includes a plurality of reinforcing cords extending in the tire radial direction, and is folded back around a bead core 5 disposed in each of the bead portions 3 from the vehicle inner side to the vehicle outer side. Additionally, bead fillers 6 are disposed on the outer circumference of the bead cores 5, and each bead filler 6 is enveloped by a main body portion and a folded back portion of the carcass layer 4. A plurality (in the example of the drawing, two layers) of belt layers 7 are embedded on an outer circumferential side of the carcass layer 4 in the tread portion 1. The belt layers 7 each include a plurality of reinforcing cords that are inclined with respect to the tire circumferential direction, the direction of the reinforcing cords of the different layers intersect each other. In these belt layers 7, the inclination angle of the reinforcing cords with respect to the tire circumferential direction is set in the range, for example, of from 10° to 40°. In addition, a plurality of belt cover layers 8 are provided on the outer circumferential side of the belt layers 7. In the example of FIG. 1, two layers including a single full cover layer 8f and an edge cover 8e are provided. The full cover layer 8f is adjacent to the outer circumferential side of the belt layers 7, and cover the entire width of the belt layers 7. The edge cover 8e is disposed on the outer circumference side of the full cover layer 8f, and locally covers both end portions of the belt layers 7 and both end portions of the full cover layer 8f in the width direction. Each of the belt cover layers 8 includes organic fiber cords oriented in the tire circumferential direction, and the angle of the organic fiber cords with respect to the tire circumferential direction is set, for example, to from 0° to 5°.

In the present technology, sound absorbing members are mounted on such a typical pneumatic tire as described later, and are set to be disposed on land portions defined by circumferential grooves in the outer surface of the tread portion 1. Thus, the basic cross-sectional structure of the pneumatic tire on which the sound absorbing members are mounted is not limited to the structure described above.

In the present technology, two or more circumferential grooves 10 extending in the tire circumferential direction are formed in the outer surface of the tread portion 1. One or more land portions 21 and two (one for each side in the tire lateral direction) shoulder land portions 22 are formed by these circumferential grooves 10. The land portion 21 is defined by being sandwiched by two circumferential grooves 10 adjacent to each other in the tire lateral direction. The shoulder land portion 22 is defined on each of the outer sides of the circumferential grooves 10 in the tire lateral direction, which are positioned on the outermost sides of the tire lateral direction. The land portions 21 are required to include a center land portion 21c, which continuously extends along the entire circumference of the tire and is disposed on the tire equator CL. Further, when four or more circumferential grooves 10 are provided to define three or more land portions 21, the land portions 21 include an innermost land portion 21i disposed at a position adjacent to the vehicle outer side of the circumferential groove 10, which continuously extends along the entire circumference of the tire and is positioned on the vehicle innermost side. In the illustrated example, the outer surface of the tread portion 1 includes four circumferential grooves 10, and three land portions 21 and two shoulder land portions 22 are formed. The land portions 21 include the center land portion 21c and the innermost land portion 21i.

In the present technology, sound absorbing members 30 are mounted on an inner surface of the tire. Particularly, in the present technology, as the sound absorbing members 30, a pair of sound absorbing members 30 including a first sound absorbing member 31 and a second sound absorbing member 32 disposed to be separated from each other in the tire lateral direction are used. Each of the first sound absorbing member 31 and the second sound absorbing member 32 is formed of a band-like porous material extending in the tire circumferential direction. The porous material forming the sound absorbing member 30 has open cells, and has predetermined noise absorbing properties based on the porous structure. For example, polyurethane foam may be used as the porous material forming the sound absorbing member 30. The sound absorbing member 30 is adhered via, for example, an adhesive layer 40 in the region on the tire inner surface corresponding to the tread portion 1. For example, a double-sided tape is preferably used as the adhesive layer 40. A dimension of the sound absorbing member 30 may be set as appropriate depending on the size of the pneumatic tire being a mounting target and the desired sound absorbing performance. In order to obtain a sufficient sound absorbing performance, a volume of the sound absorbing members 30 (total volume of the first sound absorbing member 31 and the second sound absorbing member 32) is set to from 10% to 40% of a capacity of the tire cavity.

Figure 2:
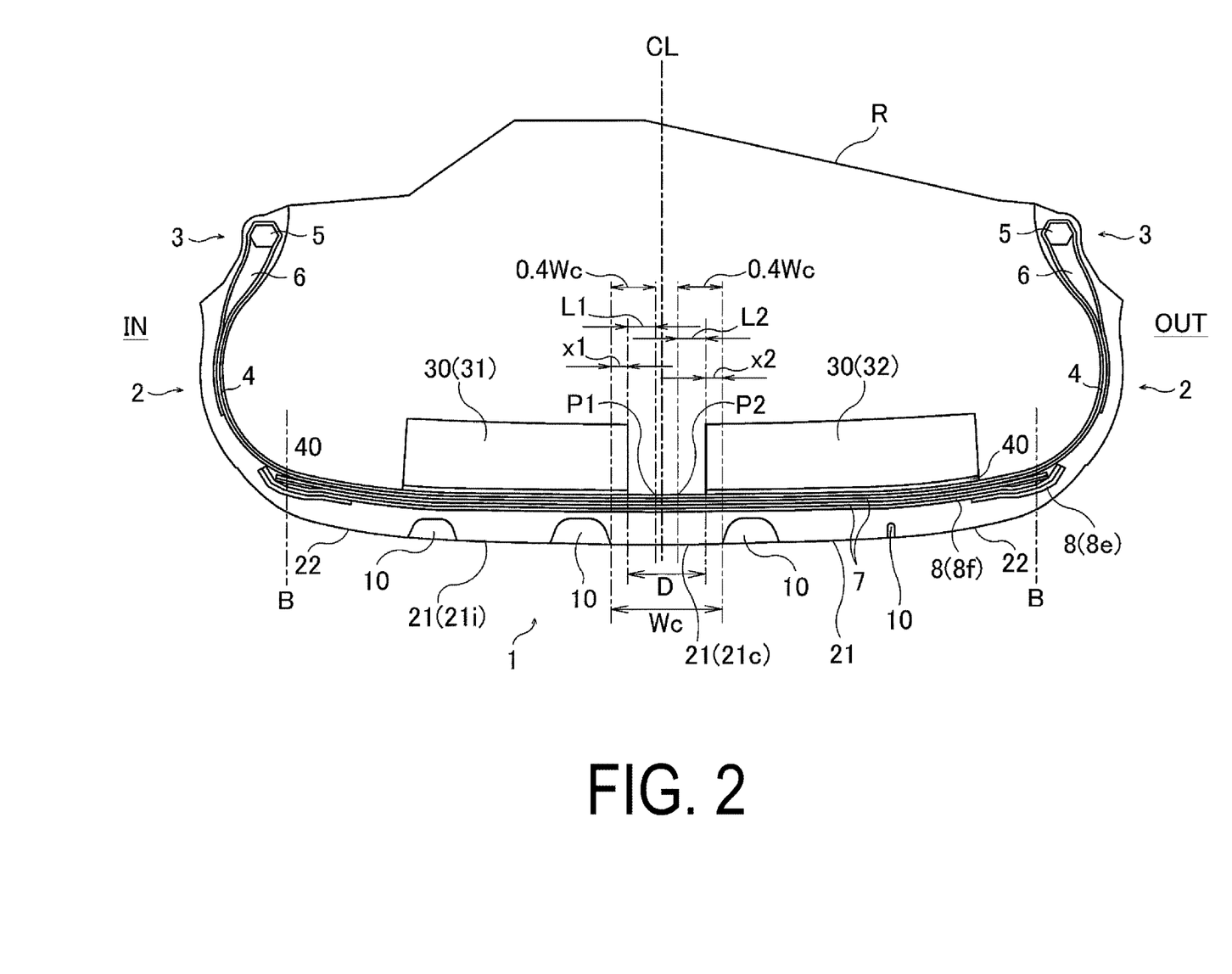
FIG. 2 is a meridian cross-sectional view of the pneumatic tire according to the embodiment of the present technology.

When the sound absorbing members 30 having such a sufficient size is directly adhered to the tire inner surface, heat is accumulated in the sound absorbing members 30 at high speeds, and the high-speed durability is adversely influenced. Thus, in the present technology, as illustrated in FIG. 2, the first sound absorbing member 31 is disposed on the vehicle inner side with respect to a position of 40% of a width Wc of the center land portion 21c from an end portion of the center land portion 21c on the vehicle inner side to the vehicle outer side. The second sound absorbing member 32 is disposed on the vehicle outer side with respect to a position of 40% of the width Wc of the center land portion 21c from an end portion of the center land portion 21c on the vehicle outer side to the vehicle inner side. At the same time, the first sound absorbing member 31 and the second sound absorbing member 32 are separated from each other by 60% or greater of the width Wc of the center land portion 21c.

Note that, such an arrangement of the sound absorbing members 30 is preferred in a case where the mounting direction on the vehicle is designated as in the illustrated example. When the mounting direction on the vehicle is not designated, the first sound absorbing member 31 is positioned on one side in the tire lateral direction with respect to the position of 40% of the width Wc of the center land portion 21c from one end portion of the center land portion 21c in the tire lateral direction to the other side in the tire lateral direction. The second sound absorbing member 32 is positioned on the other side in the tire lateral direction with respect to the position of 40% of the width Wc of the center land portion 21c from the other end portion of the center land portion 21c in the tire lateral direction to the one side in the tire lateral direction. At the same time, a separation direction D between the first sound absorbing member 31 and the second sound absorbing member 32 is set to 60% or larger of the width Wc of the center land portion 21c.

In this arrangement of the sound absorbing members 30, both of the first sound absorbing member 31 and the second sound absorbing member 32 are disposed so as to avoid a position corresponding to the center land portion 21c on the tire inner circumferential surface. When a reference point P1 is a position of 40% of the width Wc of the center land portion 21c from the end portion of the center land portion 21c on vehicle inner side to the vehicle outer side, and a reference point P2 is a position of 40% of the width Wc of the center land portion 21c from the end portion of the center land portion 21c on the vehicle outer side to the vehicle inner side, the first sound absorbing member 31 is positioned outward of the reference point P1 in the tire lateral direction (on the vehicle inner side). In this case, a distance L1 between the reference point P1 and an end of the first sound absorbing member 31 inward of the tire lateral direction (on the vehicle outer side) is 0% or more of the width Wc of the center land portion 21c. Further, the second sound absorbing member 32 is positioned outward of the reference point P2 in the tire lateral direction (on the vehicle outer side), and a distance L2 between the reference point P2 and an end of the first sound absorbing member 31 inward of the tire lateral direction (on the vehicle inner side) is 0% or more of the width Wc of the center land portion 21c. Further, even when the sound absorbing members 31 and 32 overlap with the center land portion 21c, an amount of overlap X (sum of an amount of overlap x1 of the first sound absorbing member 31 and an amount of overlap x2 of the second sound absorbing member 32) is set to be 40% or smaller of the width Wc of the center land portion.

In order to improve the noise performance through use of the sound absorbing members 30 having a sufficient ratio of the volume of the sound absorbing members 30 to the capacity of the tire cavity (the volume ratio of the sound absorbing members 30), the pair of the sound absorbing members 30 including the first sound absorbing member 31 and the second sound absorbing member 32 are employed as described above. The pair of sound absorbing members 30 are separated from each other as described above, and are disposed at the positions while avoiding the inner surface side of the center land portion 21c, in which heat is most liable to be generated in the tread portion 1 and accumulated heat is liable to be generated when the sound absorbing members 30 are directly adhered. Accordingly, the accumulated heat is effectively suppressed at high speeds, and the high-speed durability can be improved. Also, the noise performance and the high-speed durability can be provided in a well-balanced and compatible manner to a high degree.

With this configuration, when the volume of the sound absorbing members 30 is smaller than 10% of the cavity volume of the tire, it becomes difficult to achieve the sound absorbing effect sufficiently. When the volume of the sound absorbing members 30 is larger than 40% of the capacity of the tire cavity, the influence of the accumulated heat and the like becomes greater, which may cause a risk of impeding the tire performance. Further, the reduction effect for the cavernous resonance is saturated, and hence a further noise reduction effect cannot be expected. In a case where a single sound absorbing member is used as the sound absorbing members 30 instead of the pair like the first sound absorbing member 31 and the second sound absorbing member 32, to achieve the above-mentioned volume ratio, the arrangement of avoiding the center land portion 21c in which heat generation is liable to occur is difficult to employ. Accordingly, the accumulated heat is increased at high speeds, and the high-speed durability cannot be improved. When the arrangement of the sound absorbing members 30 does not satisfy the above-mentioned relationship and the amount of overlap X of the sound absorbing members 30 and the center land portion exceeds 40% of the width Wc of the center land portion, the accumulated heat is increased, and the high-speed durability cannot be improved.

Figure 3:
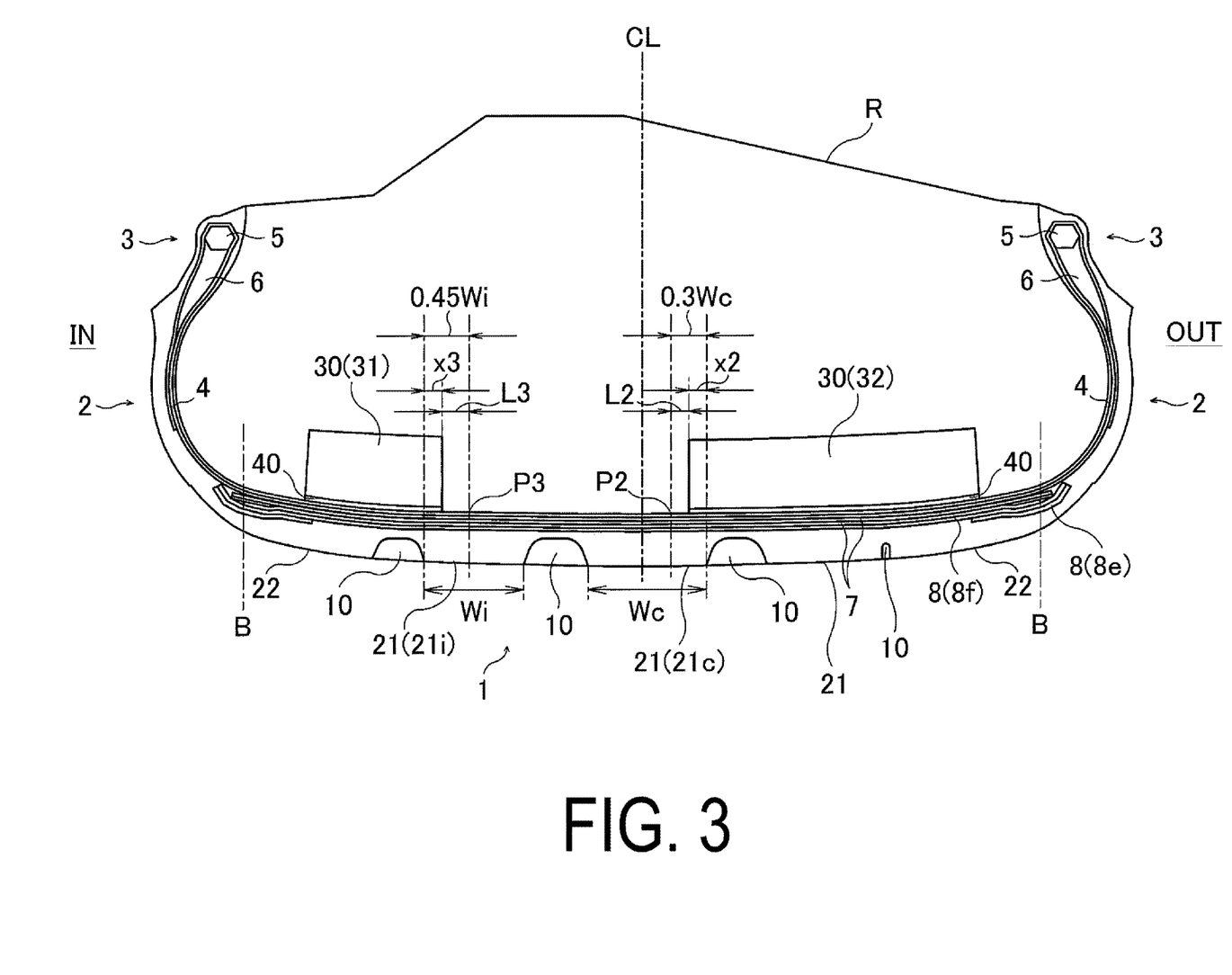
FIG. 3 is a meridian cross-sectional view of a pneumatic tire according to another embodiment of the present technology.

The above-mentioned positional relationship may also be applied to a case where two circumferential grooves 10 are provided and only the center land portion 21c is formed as the land portion 21. However, in a case where more than two circumferential grooves 10 are provided in the tire having the designated mounting direction on the vehicle, particularly, where four or more circumferential grooves 10 are provided and three or more land portions 21 (including the center land portion 21c and the innermost land portion 21i) and two shoulder land portions 22 are formed, it is preferred that the sound absorbing members 30 be disposed so as to avoid the region from the center land portion 21c to the innermost land portion 21i as illustrated in FIG. 3, as well as avoiding the center land portion 21c as described above. Specifically, it is preferred that the first sound absorbing member 31 be disposed on the vehicle inner side with respect to a position of 45% of a width Wi of the innermost land portion 21i from an end portion of the innermost land portion 21i on the vehicle inner side to the vehicle outer side and that the second sound absorbing member 32 be disposed on the vehicle outer side with respect to a position of 30% of the width Wc of the center land portion 21c from an end portion of the center land portion 21c on the vehicle outer side to the vehicle inner side.

In other words, when a reference point P3 is a position of 45% of the width Wi of the innermost land portion 21i from the end portion of the innermost land portion 21i on the vehicle inner side to the vehicle outer side, it is preferred that the first sound absorbing member 31 be positioned outward of the reference point P3 in the tire lateral direction (on the vehicle inner side) so that a distance L3 between the reference point P3 and an end portion of the first sound absorbing member 31 inward of the tire lateral direction (on the vehicle outer side) is 0% or larger of the width Wi of the innermost land portion 21i. Also, it is preferred that the second sound absorbing member 32 be positioned outward of the reference point P2 in the tire lateral direction (on the vehicle outer side) so that the distance L2 between the reference point P2 and the end portion of the first sound absorbing member 31 inward of the tire lateral direction (on the vehicle inner side) is 10% or larger of the width Wc of the center land portion 21c. That is, even when the first sound absorbing member 31 overlaps with the innermost land portion 21*i*, it is preferred that such amount of overlap x3 be 45% or smaller of the width Wi of the innermost land portion 21*i*. Even when the second sound absorbing member 32 overlaps with the center land portion 21*c*, it is preferred that the amount of overlap x2 be 30% or smaller of the width We of the center land portion.

With this structure, in the vehicle intended for high-speed driving on which the tires are mounted mainly in negative camber, in a case where four or more circumferential grooves 10 are provided to provide a large number of land portions (three or more land portions 21), the sound absorbing members 30 can be provided while avoiding the region from the center land portion 21*c* to the innermost land portion 21*i* (region in which heat is liable to be generated after the center land portion 21*c*) as well as the center land portion 21*c*. Accordingly, the accumulated heat is prevented more effectively, and the high-speed durability can further be improved. In this case, when the amounts of overlap x2 and x3 exceed the above-mentioned ranges, it is difficult to achieve the effective prevention of accumulated heat in the pneumatic tire, which includes three or more land portions 21 and is set in negative camber.

In all cases, it is preferred that the end portions of the sound absorbing members 30 outward of the tire lateral direction be positioned inward of the tire lateral direction with respect to an end portion position B of the belt layers 7 outward of the tire lateral direction. That is, even when the pair of sound absorbing members 30 (the first sound absorbing member 31 and the second sound absorbing member 32) are disposed while avoiding the center land portion 21*c* or the region from the center land portion 21*c* to the innermost land portion 21*i*, it is preferred that the sound absorbing members 30 be disposed not to cross the end portion position B of the belt layers 7 outward of the tire lateral direction. By disposing the sound absorbing members 30 as described above, the sound absorbing members 30 are not influenced by distortion caused in the end portion position B of the belt layers 7, which is advantageous in improving the high-speed durability.

The volume of the first sound absorbing member 31 and the volume of the second sound absorbing member 32 may match with each other or be different from each other. However, as the example illustrated in FIG. 1 and FIG. 3, in the case of the tire having the designated mounting direction on the vehicle, it is preferred that the sound absorbing member on the vehicle inner side (the first sound absorbing member 31 in FIG. 1) have a volume V1 smaller than a volume V2 of the sound absorbing member on the vehicle outer side (the second sound absorbing member 32 in FIG. 1). Particularly, it is preferred that a ratio V2/V1 of the volume V1 and the volume V2 satisfy a relationship of $1.2 \leq V2/V1 \leq 3.8$. In a general vehicle intended for high-speed driving, the tires are mounted in negative camber, and hence heat is relatively liable to be generated on the vehicle inner side in the tire having the designated mounting direction on the vehicle. Thus, by satisfying the above-mentioned volume relationship, an amount of the sound absorbing member 30 (the first sound absorbing member 31) causing the accumulated heat is reduced in on the vehicle inner side to improve the high-speed durability. On the vehicle outer side on which heat is relatively less liable to be generated, a relatively large amount of the sound absorbing member 30 (the second sound absorbing member 32) is secured. Accordingly, the noise performance can be improved. As a result, it is advantageous in providing the high-speed durability and the noise performance in a well-balanced and compatible manner. In this case, when the volume ratio of the sound absorbing members 30 of V2/V1 is smaller than 1.2, there is almost no volume difference between the volume on the vehicle inner side and the volume of the vehicle outer side. Thus, it is difficult to provide the high-speed durability and the noise performance in a balanced manner. When the volume ratio of the sound absorbing members 30 of V2/V1 is larger than 3.8, the sound absorbing member 30 on the vehicle inner side (the first sound absorbing member 31) is so small that the sound absorbing performance of the first sound absorbing member 31 is insufficient. Alternatively, the sound absorbing member on the vehicle outer side (the second sound absorbing member 32) is so large that the accumulated heat due to the second sound absorbing member 32 is increased.

Figure 4:
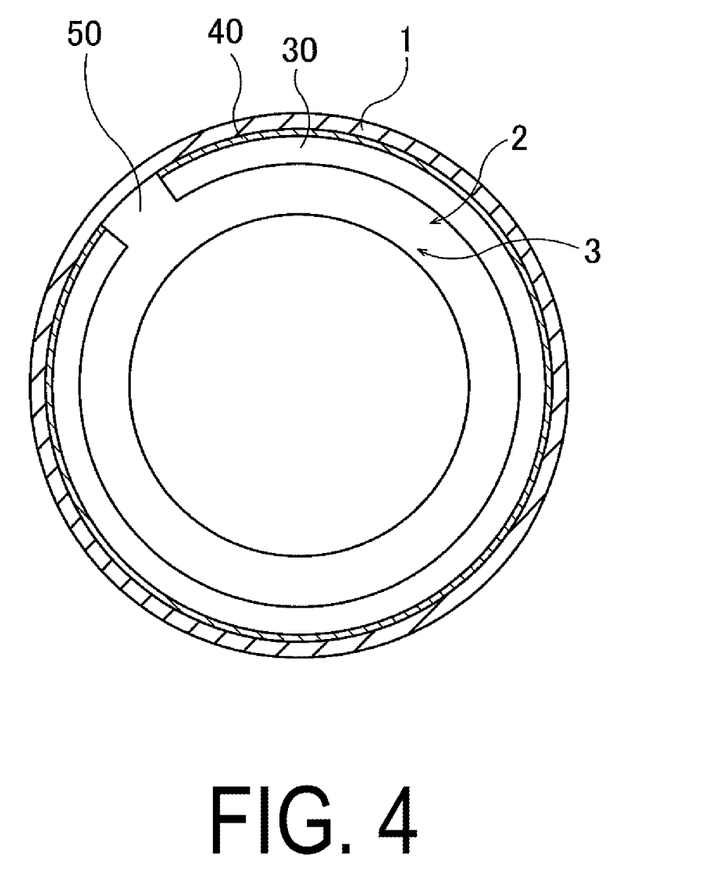
FIG. 4 is an equator cross-sectional view of the pneumatic tire according to the embodiment of the present technology.

For the first sound absorbing member 31 and the second sound absorbing member 32, as illustrated in FIG. 4, it is preferred that the sound absorbing member 30 includes a missing portion 50 in which the sound absorbing member 30 is not present at at least one section in the tire circumferential direction be used. Expansion of the tire during inflation or shearing strain due to rolling on ground can be tolerated for a long period of time by providing the missing portion 50 as described above. It is preferred that one or three to five missing portions 50 be provided on the tire circumference. That is, when two missing portions 50 are provided on the tire circumference, tire uniformity is significantly degraded due to mass unbalance. When six or more missing sections are provided on the circumference, production cost is significantly increased. Note that, the missing portion 50 provided in the first sound absorbing member 31 and the missing portion 50 provided in the second sound absorbing member 32 may have positions in the tire circumferential direction matching with each other or different from each other.

EXAMPLES

Twenty-nine kinds of pneumatic tires in Conventional Examples 1 to 2, Comparative Examples 1 to 2, and Examples 1 to 26, each of which had a tire size of 275/35ZR20 and a basic configuration illustrated in FIG. 1, were manufactured with the following conditions set as shown in Tables 1 to 2: mounting direction with respect to the vehicle specified for the pneumatic tire, form of the sound absorbing member(s), volume ratio of the sound absorbing member(s), ratio of the volume V1 of the first sound absorbing member and the volume V2 of the second sound absorbing member (volume ratio of V2/V1), the distances L1 to L3, separation direction D, amounts of overlap x1 to x3, amount of overlap X (sum of the amounts of overlap x1 and x2), position(s) of the end portion(s) of the sound absorbing member(s) on the outer side in the tire lateral direction, and the number of missing portions.

Note that, as for the column regarding the form of the sound absorbing member(s), when a single band-like sound absorbing member was used, "Single" is shown, and when two band-like sound absorbing members (the first sound absorbing member and the second sound absorbing member) were used, "Pair" is shown. The volume ratio of the sound absorbing member indicates a ratio (%) of the volume of the sound absorbing member to the capacity of the tire cavity. When the pair of sound absorbing members (the first sound absorbing member and the second sound absorbing member) were provided, the volume ratio indicates a ratio (%) of the total volume of the pair of sound absorbing members to the capacity of the tire cavity.

The reference point P1 is the position of 40% of the width Wc of the center land portion from the end portion of the center land portion on the vehicle inner side to the vehicle outer side. The reference point P2 is the position of 40% of the width Wc of the center land portion from the end portion of the center land portion on the vehicle outer side to the vehicle inner side. The reference point P3 is the position of 45% of the width Wi of the innermost land portion from the end portion of the innermost land portion on the vehicle inner side to the vehicle outer side. In this case, the distances L1 to L3 include the distance (L1) between the reference point P1 and the end portion of the first sound absorbing member on the inner side in the tire lateral direction (on the vehicle outer side), the distance (L2) between the reference point P2 and the end portion of the second sound absorbing member on the inner side in the tire lateral direction (on the vehicle inner side), and the distance (L3) between the reference point P3 and the end portion of the first sound absorbing member on the inner side in the tire lateral direction (on the vehicle outer side), respectively. Each of the distances L1 and L2 is indicated by the ratio (%) to the width Wc of the center land portion, and the distance L3 is indicated by the ratio (%) to the width Wi of the innermost land portion. When the mounting direction on the vehicle is not designated in the pneumatic tire, "vehicle inner side" and "vehicle outer side" in the description above are considered as "one side in the tire lateral direction" and "the other side in the tire lateral direction," respectively. In the case where the first sound absorbing member was positioned outward of the tire lateral direction with respect to the reference point P3, the distance L1 is omitted. When the first sound absorbing member was positioned is positioned inward of the tire lateral direction with respect to the reference points P1 to P3, a negative value is shown.

The separation direction D is a distance between the first sound absorbing member and the second sound absorbing member, and is indicated by the ratio (%) to the width Wc of the center land portion. In the example in which the first sound absorbing member is positioned outward of the tire lateral direction with respect to the reference point P3, and the separation direction D is significantly larger than the width Wc of the center land portion, the separation direction D is omitted.

The amounts of overlap x1 to x3 include the amount of overlap (x1) of the first sound absorbing member and the center land portion, the amount of overlap (x2) of the second sound absorbing member and the center land portion, the amount of overlap (x3) of the first sound absorbing member and the innermost land portion, respectively. Each of the amounts of overlap x1 and x2 is indicated by the ratio (%) to the width Wc of the center land portion, and the amount of overlap x3 is indicated by the ratio (%) to the width Wi of the innermost land portion. In the example in which the first sound absorbing member is positioned outward of the tire lateral direction with respect to the reference point P3, the amount of overlap x1 is omitted.

As for the positions of the end portions of the sound absorbing members on the outer side in the tire lateral direction, when the end portions are disposed inward in the tire lateral direction with respect to the end portions of the belt layers on the outer side in the tire lateral direction, "Inner side" is shown. When the end portions are disposed at the positions of the end portions of the belt layers on the outer side in the tire lateral direction, "Match" is shown. When the end portions are disposed outward of the tire lateral direction with respect to the positions of the end portions of the belt layers on the outer side in the tire lateral direction, "Outer side" is shown. Note that, in the example in which this item is "Outer side", each of the end portions of the sound absorbing members on the inner side in the tire lateral direction overlaps with the center land portion or the innermost land portion. Thus, the sound absorbing members are disposed across the end portions of the belt layers on the outer side in the tire lateral direction.

These twenty-nine types of pneumatic tires were evaluated for high-speed durability and quietness by the evaluation methods described below. The results are also shown in Table 1.

High-Speed Durability

Each of the test tires was assembled on a wheel having a rim size of 20×9.5 J, and inflated to an air pressure of 270 kPa. A traveling test was carried out using a drum testing machine under the conditions of a camber angle of 0° or −2° and a load of 7.5 kN. Specifically, an initial speed was set to 250 km/h, and the speed was increased by 10 km/h every twenty minutes. The driving was performed until a failure occurred to the tire, and the speed at the time when the failure occurred to the tire was measured. As the evaluation result, the measurement value (speed) for each of the test tires was shown. Larger index values indicate superior high-speed durability. Note that, in Tables 1 and 2, the evaluation result in the case of the camber angle of 0° and the evaluation result in the case of the camber angle of −2° were shown in the different columns. The high-speed durability with the camber angle of −2° assumed the high-speed durability performance in the case where the tire was mounted to the vehicle in negative camber intended for high-speed driving. That is, a satisfactory result obtained at least in the case of the camber angle of 0° indicates that satisfactory high-speed durability can be obtained. Also, a satisfactory result obtained also in the case of the camber angle of −2° indicates that excellent high-speed durability can further be obtained.

Quietness

Each of the test tires was mounted on a wheel having a rim size of 20×9.5 J, inflated to an air pressure of 230 kPa, and mounted on a test vehicle with engine displacement of 3000 cc. The test vehicle was driven on a test course with an asphalt road surface at an average speed of 50 km/h. The level of sound pressure of the noise collected by a microphone attached at a window position of driver's seat was measured. As the evaluation results, the reciprocals of the measurement results were categorized into five grades with the product of Convention Example 1 being assigned grade 3. Higher grades indicate superior quietness.

TABLE 1-1

|  | Conventional Example 1 | Comparative Example 1 | Comparative Example 2 | Example 1 | Example 2 |
|---|---|---|---|---|---|
| Designated mounting direction | No | No | No | No | No |
| Form of sound absorbing member | Single | Pair | Pair | Pair | Pair |

TABLE 1-1-continued

|  | Conventional Example 1 | Comparative Example 1 | Comparative Example 2 | Example 1 | Example 2 |
|---|---|---|---|---|---|
| Volume ratio of sound absorbing member | 20 | 20 | 20 | 20 | 20 |
| Volume ratio V2/V1 | 0 | 1 | 1 | 1 | 1 |
| Distance L1 | — | −5 | 0 | 20 | 0 |
| Distance L2 | — | −5 | 0 | 20 | 40 |
| Distance L3 | — | — | — | — | — |
| Separation distance D | — | 10 | 20 | 60 | 60 |
| Amount of overlap x1 | — | 45 | 40 | 20 | 40 |
| Amount of overlap x2 | — | 45 | 40 | 20 | 0 |
| Amount of overlap X | 100 | 90 | 80 | 40 | 40 |
| Amount of overlap x3 | — | — | — | — | — |
| Position of outer end portion of sound absorbing member in tire lateral direction | Inner side | Inner side | Inner side | Inner side | Inner side |
| Number of missing portions | 1 | 1 | 1 | 1 | 1 |
| High-speed durability (Camber angle 0°) km/h | 310 | 310 | 310 | 330 | 330 |
| High-speed durability (Camber angle −2°) km/h | 310 | 310 | 310 | 320 | 320 |
| Quietness | 3 | 3 | 3 | 3 | 3 |

TABLE 1-2

|  | Example 3 | Example 4 | Example 5 | Example 6 | Example 7 | Example 8 |
|---|---|---|---|---|---|---|
| Designated mounting direction | No | No | No | No | No | Yes |
| Form of sound absorbing member | Pair | Pair | Pair | Pair | Pair | Pair |
| Volume ratio of sound absorbing member | 20 | 20 | 20 | 20 | 20 | 5 |
| Volume ratio V2/V1 | 1 | 1 | 1 | 1 | 1 | 1 |
| Distance L1 | 40 | 25 | 35 | 40 | 45 | 25 |
| Distance L2 | 0 | 25 | 35 | 40 | 45 | 25 |
| Distance L3 | — | — | — | — | — | — |
| Separation distance D | 40 | 70 | 90 | 100 | 110 | 70 |
| Amount of overlap x1 | 0 | 15 | 5 | 0 | 0 | 15 |
| Amount of overlap x2 | 40 | 15 | 5 | 0 | 0 | 15 |
| Amount of overlap X | 40 | 30 | 10 | 0 | 0 | 30 |
| Amount of overlap x3 | — | — | — | — | — | — |
| Position of outer end portion of sound absorbing member in tire lateral direction | Inner side | Inner side | Inner side | Inner side | Inner side | Inner side |
| Number of missing portions | 1 | 1 | 1 | 1 | 1 | 1 |
| High-speed durability (Camber angle 0°) km/h | 330 | 330 | 330 | 330 | 330 | 330 |
| High-speed durability (Camber angle −2°) km/h | 320 | 320 | 320 | 320 | 320 | 320 |
| Quietness | 3 | 3 | 3 | 3 | 3 | 3 |

TABLE 1-3

|  | Example 9 | Example 10 | Example 11 |
|---|---|---|---|
| Designated mounting direction | Yes | Yes | Yes |
| Form of sound absorbing member | Pair | Pair | Pair |
| Volume ratio of sound absorbing member | 10 | 40 | 45 |
| Volume ratio V2/V1 | 1 | 1 | 1 |
| Distance L1 | 25 | 25 | 25 |
| Distance L2 | 25 | 25 | 25 |
| Distance L3 | — | — | — |
| Separation distance D | 70 | 70 | 70 |
| Amount of overlap x1 | 15 | 15 | 15 |
| Amount of overlap x2 | 15 | 15 | 15 |
| Amount of overlap X | 30 | 30 | 30 |
| Amount of overlap x3 | — | — | — |
| Position of outer end portion of sound absorbing member in tire lateral direction | Inner side | Inner side | Inner side |
| Number of missing portions | 1 | 1 | 1 |
| High-speed durability (Camber angle 0°) km/h | 330 | 330 | 330 |
| High-speed durability (Camber angle −2°) km/h | 320 | 320 | 320 |
| Quietness | 3 | 3.5 | 3.5 |

TABLE 2-1

|  | Example 12 | Example 13 | Example 14 | Example 15 | Example 16 | Example 17 |
|---|---|---|---|---|---|---|
| Designated mounting direction | Yes | No | No | No | No | No |
| Form of sound absorbing member | Pair | Pair | Pair | Pair | Pair | Pair |
| Volume ratio of sound absorbing member | 20 | 20 | 20 | 20 | 20 | 20 |
| Volume ratio V2/V1 | 0.5 | 1.2 | 2 | 3.8 | 4 | 2 |
| Distance L1 | 25 | 25 | 25 | 25 | 25 | — |
| Distance L2 | 25 | 25 | 25 | 25 | 25 | 0 |
| Distance L3 | — | — | — | — | — | −5 |
| Separation distance D | 70 | 70 | 70 | 70 | 70 | — |
| Amount of overlap x1 | 15 | 15 | 15 | 15 | 15 | — |
| Amount of overlap x2 | 15 | 15 | 15 | 15 | 15 | 40 |
| Amount of overlap X | 30 | 30 | 30 | 30 | 30 | — |
| Amount of overlap x3 | — | — | — | — | — | 50 |
| Position of outer end portion of sound absorbing member in tire lateral direction | Inner side | Inner side | Inner side | Inner side | Inner side | Inner side |
| Number of missing portions | 1 | 1 | 1 | 1 | 1 | 1 |
| High-speed durability (Camber angle 0°) km/h | 330 | 330 | 330 | 330 | 330 | 330 |
| High-speed durability (Camber angle −2°) km/h | 320 | 330 | 330 | 330 | 330 | 340 |
| Quietness | 3 | 3.5 | 3.5 | 3.5 | 3 | 3 |

TABLE 2-2

|  | Example 18 | Example 19 | Example 20 | Example 21 | Example 22 | Example 23 |
|---|---|---|---|---|---|---|
| Designated mounting direction | No | No | No | No | No | No |
| Form of sound absorbing member | Pair | Pair | Pair | Pair | Pair | Pair |
| Volume ratio of sound absorbing member | 20 | 20 | 20 | 20 | 20 | 20 |
| Volume ratio V2/V1 | 2 | 2 | 2 | 2 | 2 | 2 |
| Distance L1 | — | — | — | — | — | — |
| Distance L2 | 10 | 20 | 30 | 40 | 10 | 10 |
| Distance L3 | 0 | 10 | 25 | 45 | 0 | 0 |
| Separation distance D | — | — | — | — | — | — |
| Amount of overlap x1 | — | — | — | — | — | — |
| Amount of overlap x2 | 30 | 20 | 10 | 0 | 30 | 30 |
| Amount of overlap X | — | — | — | — | — | — |
| Amount of overlap x3 | 45 | 35 | 20 | 0 | 45 | 45 |
| Position of outer end portion of sound absorbing member in tire lateral direction | Inner side | Inner side | Inner side | Inner side | Match | Outer side |
| Number of missing portions | 1 | 1 | 1 | 1 | 1 | 1 |
| High-speed durability (Camber angle 0°) km/h | 340 | 340 | 340 | 340 | 340 | 340 |
| High-speed durability (Camber angle −2°) km/h | 340 | 340 | 340 | 340 | 340 | 340 |
| Quietness | 3 | 3 | 3 | 3 | 3 | 3 |

TABLE 2-3

|  | Example 24 | Example 25 | Example 26 |
|---|---|---|---|
| Designated mounting direction | No | No | No |
| Form of sound absorbing member | Pair | Pair | Pair |
| Volume ratio of sound absorbing member | 20 | 20 | 20 |
| Volume ratio V2/V1 | 2 | 2 | 2 |
| Distance L1 | — | — | — |
| Distance L2 | 10 | 10 | 10 |
| Distance L3 | 0 | 0 | 0 |
| Separation distance D | — | — | — |
| Amount of overlap x1 | — | — | — |
| Amount of overlap x2 | 30 | 30 | 30 |
| Amount of overlap X | — | — | — |
| Amount of overlap x3 | 45 | 45 | 45 |
| Position of outer end portion of sound absorbing member in tire lateral direction | Inner side | Inner side | Inner side |
| Number of missing portions | 0 | 2 | 3 |
| High-speed durability (Camber angle 0°) km/h | 340 | 340 | 340 |
| High-speed durability (Camber angle −2°) km/h | 340 | 340 | 340 |
| Quietness | 3 | 3 | 3 |

As can be seen from Table 1, in each of Examples 1 to 26, the high-speed durability was improved while the quietness was maintained, as compared to Conventional Example 1. Particularly, in the examples in which the volume ratio of V2/V1, the distances L1 to L3, and the amounts of overlap x1 to x3 are set within suitable ranges in Examples 8 to 26 with the designated mounting direction on the vehicle, the high-speed durability in the case of being set in negative camber was able to be further improved. Meanwhile, in Comparative Examples 1 and 2, the amount of overlap of the sound absorbing member and the center land portion were so large that the accumulated heat was increased. Thus, the high-speed durability was not able to be improved.

The invention claimed is:

1. A pneumatic tire, comprising:
   a tread portion extending in a tire circumferential direction and having an annular shape;
   a pair of side wall portions disposed on both sides of the tread portion;
   a pair of bead portions disposed inward of the pair of side wall portions in a tire radial direction;
   a carcass layer mounted between the pair of bead portions;
   a plurality of belt layers disposed on an outer circumferential side of the carcass layer in the tread portion;
   a plurality of belt cover layers disposed on the outer circumferential side of the plurality of belt layers, the plurality of belt cover layers including edge cover layers locally covering both end portions of the belt layers in a tire lateral direction;
   circumferential grooves extending along the tire circumferential direction in a tire outer surface of the tread portion; and
   land portions defined between the circumferential grooves that are adjacent to each other in the tire lateral direction, wherein
   a number of the circumferential grooves is two or more,
   a number of the land portions is one or more,
   the one or more land portions include a center land portion continuously extending along an entire circumference of the tire and being disposed on a tire equator,
   a first sound absorbing member and a second sound absorbing member are adhered on radially outermost surfaces of the first sound absorbing member and the second sound absorbing member by an adhesive to a tire inner surface of the tread portion,
   the first sound absorbing member and the second sound absorbing member are porous and have a total volume ranging from 21% to 40% of a capacity of a tire cavity,
   the first sound absorbing member is disposed on one side in the tire lateral direction with respect to a position of 40% of a width Wc of the center land portion from one end portion of the center land portion on one side in the tire lateral direction to an other side in the tire lateral direction,
   the second sound absorbing member is disposed on the other side in the tire lateral direction with respect to a position of 40% of the width Wc of the center land portion from one end portion of the center land portion on the other side in the tire lateral direction to the one side in the tire lateral direction,
   the first sound absorbing member and the second sound absorbing member are separated from each other by 60% or more of the width Wc of the center land portion,
   a mounting direction on a vehicle is designated,
   the one side in the tire lateral direction is a vehicle inner side being an inner side with respect to the vehicle at a time of mounting on the vehicle, and the other side in the tire lateral direction is a vehicle outer side being an outer side with respect to the vehicle at a time of mounting on the vehicle,
   a volume V1 of the first sound absorbing member is smaller than a volume V2 of the second sound absorbing member,
   a ratio of V2/V1 of the volume V1 of the first sound absorbing member and the volume V2 of the second sound absorbing member satisfies a relationship of $2<V2/V1<3.8$,
   end portions of the first sound absorbing member and the second sound absorbing member on the outer side in the tire lateral direction are positioned inward in the tire lateral direction with respect to end portions of the plurality of belt layers on the outer side in the tire lateral direction,
   at least one of the first sound absorbing member or the second sound absorbing member overlaps with the center land portion, and an amount of overlap of the at least one of the first sound absorbing member or the second sound absorbing member with respect to the center land portion is set to be 40% or less of the width Wc of the center land portion, and
   one of the first sound absorbing member or the second sound absorbing member overlaps with at least one of the edge cover layers and an other one of the first sound absorbing member or the second sound absorbing member does not overlap with any of the edge cover layers.

2. The pneumatic tire according to claim 1, wherein
   a mounting direction on a vehicle is designated, the one side in the tire lateral direction is a vehicle inner side being an inner side with respect to the vehicle at a time of mounting on the vehicle, and the other side in the tire lateral direction is a vehicle outer side being an outer side with respect to the vehicle at a time of mounting on the vehicle,
   the number of the circumferential grooves is four or more,
   the number of the land portions is three or more,
   in addition to the center land portion, the three or more of the land portions include an innermost land portion, which is disposed at a position adjacent to the vehicle outer side of a circumferential groove continuously extending along the entire circumference of the tire and being positioned on a vehicle innermost side,
   the first sound absorbing member is disposed on the vehicle inner side with respect to a position of 45% of a width Wi of the innermost land portion from an end portion of the innermost land portion on the vehicle inner side to the vehicle outer side, and
   the second sound absorbing member is disposed on the vehicle outer side with respect to a position of 30% of the width Wc of the center land portion from an end portion of the center land portion on the vehicle outer side to the vehicle inner side.

3. The pneumatic tire according to claim 1, wherein
   each of the first sound absorbing member and the second sound absorbing member includes a missing portion at at least one section in the tire circumferential direction.

4. The pneumatic tire according to claim 1, wherein
   the mounting direction on a vehicle is designated, the one side in the tire lateral direction is a vehicle inner side being an inner side with respect to the vehicle at a time of mounting on the vehicle, and the other side in the tire lateral direction is a vehicle outer side being an outer side with respect to the vehicle at a time of mounting on the vehicle, the number of the circumferential grooves is four or more, the number of the land portions is three or more, in addition to the center land portion, the three or more of the land portions include an innermost land portion, which is disposed at a position adjacent to the vehicle outer side of a circumferential groove continuously extending along the entire circumference of the tire and being positioned on a vehicle innermost side, the first sound absorbing member is disposed on the vehicle inner side with respect to a position of 45% of a width Wi of the innermost land portion from an end portion of the innermost land portion on the vehicle inner side to the vehicle outer side, and the second sound absorbing member is disposed on the vehicle outer side with respect to a position of 30% of the width Wc of the center land portion from an end portion of the center land portion on the vehicle outer side to the vehicle inner side.

5. The pneumatic tire according to claim 4, wherein each of the first sound absorbing member and the second sound absorbing member includes a missing portion at at least one section in the tire circumferential direction.

6. A pneumatic tire, comprising:

a tread portion extending in a tire circumferential direction and having an annular shape;

a pair of side wall portions disposed on both sides of the tread portion;

a pair of bead portions disposed inward of the pair of side wall portions in a tire radial direction;

a carcass layer mounted between the pair of bead portions;

a plurality of belt layers disposed on an outer circumferential side of the carcass layer in the tread portion;

circumferential grooves extending along the tire circumferential direction in a tire outer surface of the tread portion; and land portions defined between the circumferential grooves that are adjacent to each other in a tire lateral direction, wherein a number of the circumferential grooves is four or more, a number of the land portions is five or more, the one or more land portions include a center land portion continuously extending along an entire circumference of the tire and being disposed on a tire equator, a first sound absorbing member and a second sound absorbing member are adhered on radially outermost surfaces of the first sound absorbing member and the second sound absorbing member by an adhesive to a tire inner surface of the tread portion, the first sound absorbing member and the second sound absorbing member are porous and have a total volume ranging from 21% to 40% of a capacity of a tire cavity, the first sound absorbing member is disposed on one side in the tire lateral direction with respect to a position of 40% of a width Wc of the center land portion from one end portion of the center land portion on one side in the tire lateral direction to an other side in the tire lateral direction, the second sound absorbing member is disposed on the other side in the tire lateral direction with respect to a position of 40% of the width Wc of the center land portion from one end portion of the center land portion on the other side in the tire lateral direction to the one side in the tire lateral direction, the first sound absorbing member and the second sound absorbing member are separated from each other by 60% or more of the width Wc of the center land portion, a mounting direction on a vehicle is designated, the one side in the tire lateral direction is a vehicle inner side being an inner side with respect to the vehicle at a time of mounting on the vehicle, and the other side in the tire lateral direction is a vehicle outer side being an outer side with respect to the vehicle at a time of mounting on the vehicle, a volume V1 of the first sound absorbing member is smaller than a volume V2 of the second sound absorbing member, a ratio of V2/V1 of the volume V1 of the first sound absorbing member and the volume V2 of the second sound absorbing member satisfies a relationship of $2<V2/V1<3.8$, end portions of the first sound absorbing member and the second sound absorbing member on the outer side in the tire lateral direction are positioned inward in the tire lateral direction with respect to end portions of the plurality of belt layers on the outer side in the tire lateral direction, at least one of the first sound absorbing member or the second sound absorbing member overlaps with the center land portion, and an amount of overlap of the at least one of the first sound absorbing member or the second sound absorbing member with respect to the center land portion is set to be 40% or less of the width Wc of the center land portion, and each of the four or more circumferential grooves is overlapped by one of the first sound absorbing member or the second sound absorbing member.

* * * * *